United States Patent
Soman et al.

(10) Patent No.: US 9,886,525 B1
(45) Date of Patent: Feb. 6, 2018

(54) DATA ITEM AGGREGATE PROBABILITY ANALYSIS SYSTEM

(71) Applicant: Palantir Technologies Inc., Palo Alto, CA (US)

(72) Inventors: Satej Soman, Cupertino, CA (US); Duncan Hoffman, New York, NY (US); Salar al Khafaji, Amsterdam (NL); Jakub Kowalik, Lombard, IN (US); Pedro Sanzovo, New York, NY (US); Gautam Punukollu, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/381,518

(22) Filed: Dec. 16, 2016

(51) Int. Cl.
*G06F 17/30* (2006.01)
*G06N 7/00* (2006.01)
*G06F 3/0484* (2013.01)
*G06T 11/20* (2006.01)

(52) U.S. Cl.
CPC .... *G06F 17/30994* (2013.01); *G06F 3/04842* (2013.01); *G06N 7/005* (2013.01); *G06T 11/206* (2013.01)

(58) Field of Classification Search
CPC ................................................ G06F 17/30994
See application file for complete search history.

(56) References Cited

U.S. PATENT DOCUMENTS

| 5,819,226 A | 10/1998 | Gopinathan et al. |
| 5,892,900 A | 4/1999 | Ginter et al. |
| 6,094,643 A | 7/2000 | Anderson et al. |
| 6,430,305 B1 | 8/2002 | Decker |

(Continued)

FOREIGN PATENT DOCUMENTS

| CN | 102546446 | 7/2012 |
| CN | 103167093 | 6/2013 |

(Continued)

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

(Continued)

*Primary Examiner* — James Trujillo
*Assistant Examiner* — Aida Tessema
(74) *Attorney, Agent, or Firm* — Knobbe, Martens, Olson & Bear, LLP

(57) ABSTRACT

Computer-implemented systems and methods are disclosed for automatically aggregating, analyzing, and presenting probabilities associated with data items. Data items may be associated with probabilities or risks, and the data items may have various characteristics. A grouping of data items may be determined based on these characteristics, and probabilities within groups of data items may be aggregated and analyzed. Aggregated probabilities may be used to determine incremental probabilities for individual data items, to (Continued)

assess cumulative risk associated with a group of data items, and to analyze probabilities associated with a particular data item group. User interfaces may be generated to facilitate selection and grouping of data items, selection of risk models, and analysis of aggregate probabilities.

20 Claims, 9 Drawing Sheets

(56) References Cited

U.S. PATENT DOCUMENTS

| | | |
|---|---|---|
| 6,820,135 B1 | 11/2004 | Dingman |
| 6,978,419 B1 | 12/2005 | Kantrowitz |
| 6,980,984 B1 | 12/2005 | Huffman et al. |
| 7,072,841 B1 * | 7/2006 | Pednault ............ G06Q 40/00 705/1.1 |
| 7,168,039 B2 | 1/2007 | Bertram |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,473,454 B2 | 6/2013 | Evanitsky et al. |
| 8,484,115 B2 | 7/2013 | Aymeloglu et al. |
| 8,589,273 B2 | 11/2013 | Creeden et al. |
| 8,600,872 B1 | 12/2013 | Yan |
| 8,666,861 B2 | 3/2014 | Li et al. |
| 8,688,573 B1 | 4/2014 | Ruknoic et al. |
| 8,744,890 B1 | 6/2014 | Bernier |
| 8,798,354 B1 | 8/2014 | Bunzel et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 8,972,443 B2 * | 3/2015 | LaRowe ............ G06F 17/30864 707/770 |
| 9,032,531 B1 | 5/2015 | Scorvo et al. |
| 9,100,428 B1 | 8/2015 | Visbal |
| 9,129,219 B1 | 9/2015 | Robertson et al. |
| 2001/0027424 A1 | 10/2001 | Torigoe |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0061259 A1 | 3/2007 | Zoldi et al. |
| 2007/0106582 A1 | 5/2007 | Baker et al. |
| 2007/0150801 A1 | 6/2007 | Chidlovskii et al. |
| 2007/0156673 A1 | 7/2007 | Maga |
| 2007/0185867 A1 | 8/2007 | Maga |
| 2007/0239606 A1 | 10/2007 | Eisen |
| 2007/0284433 A1 | 12/2007 | Domenica et al. |
| 2008/0046481 A1 | 2/2008 | Gould et al. |
| 2008/0069081 A1 | 3/2008 | Chand et al. |
| 2008/0103798 A1 | 5/2008 | Domenikos et al. |
| 2008/0103996 A1 | 5/2008 | Forman et al. |
| 2008/0140576 A1 | 6/2008 | Lewis et al. |
| 2008/0222038 A1 | 9/2008 | Eden et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0301042 A1 | 12/2008 | Patzer |
| 2008/0313132 A1 | 12/2008 | Hao et al. |
| 2009/0018996 A1 | 1/2009 | Hunt et al. |
| 2009/0076845 A1 | 3/2009 | Bellin et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0187546 A1 | 7/2009 | Whyte et al. |
| 2009/0187548 A1 | 7/2009 | Ji et al. |
| 2009/0228365 A1 | 9/2009 | Tomchek et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0094765 A1 | 4/2010 | Nandy |
| 2010/0098318 A1 | 4/2010 | Anderson |
| 2010/0114887 A1 | 5/2010 | Conway et al. |
| 2010/0131502 A1 | 5/2010 | Fordham |
| 2010/0161735 A1 | 6/2010 | Sharma |
| 2010/0169192 A1 | 7/2010 | Zoldi et al. |
| 2010/0191563 A1 | 7/2010 | Schlaifer et al. |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2011/0004626 A1 | 1/2011 | Naeymi-Rad et al. |
| 2011/0055074 A1 | 3/2011 | Chen et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0099628 A1 | 4/2011 | Lanxner et al. |
| 2011/0131122 A1 | 6/2011 | Griffin et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0213655 A1 | 9/2011 | Henkin |
| 2011/0218955 A1 | 9/2011 | Tang |
| 2011/0225586 A1 | 9/2011 | Bentley et al. |
| 2011/0231305 A1 | 9/2011 | Winters |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0307382 A1 | 12/2011 | Siegel et al. |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0131512 A1 | 5/2012 | Takeuchi et al. |

(56) References Cited

U.S. PATENT DOCUMENTS

| | | |
|---|---|---|
| 2012/0158585 A1 | 6/2012 | Ganti |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0278249 A1 | 11/2012 | Duggal et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0262328 A1 | 10/2013 | Federgreen |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325826 A1 | 12/2013 | Agarwal et al. |
| 2014/0012724 A1 | 1/2014 | O'Leary et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0095363 A1 | 4/2014 | Caldwell |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106379 A1 | 4/2015 | Elliot et al. |
| 2015/0134512 A1 | 5/2015 | Mueller |
| 2015/0135256 A1 | 5/2015 | Hoy et al. |
| 2015/0161611 A1 | 6/2015 | Duke et al. |
| 2015/0188872 A1 | 7/2015 | White |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0196500 A1* | 7/2016 | Mallon ............ G06Q 10/0635 706/46 |
| 2016/0300251 A1* | 10/2016 | Den Herder .......... G06T 11/206 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| WO | WO 2005/116851 | 12/2005 |

OTHER PUBLICATIONS

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services", HiPC 2006, LNCS 4297, pp. 277-288, 2006.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kontagent Mobile Analytics, <http://www.kontagent.com/> Printed Jul. 18, 2013 in 9 pages.

Localytics—Mobile App Marketing & Analytics, <http://www.localytics.com/> Printed Jul. 18, 2013 in 12 pages.

Manno et al., "Introducing Collaboration in Single-user Applications through the Centralized Control Architecture," 2010, pp. 10.

(56) References Cited

OTHER PUBLICATIONS

Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Sigrist, et al., "Prosite, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/923,364 dated May 6, 2016.
Official Communication for European Patent Application No. 14187996.5 dated Feb. 12, 2015.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 14/141,252 dated Oct. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.

(56) References Cited

OTHER PUBLICATIONS

Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/516,386 dated Feb. 24, 2016.
Official Communication for U.S. Appl. No. 14/516,386 dated Jun. 30, 2016.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/842,734 dated Nov. 19, 2015.
Official Communication for U.S. Appl. No. 14/923,374 dated May 23, 2016.
Official Communication for U.S. Appl. No. 14/923,374 dated Feb. 9, 2016.
Official Communication for U.S. Appl. No. 15/017,324 dated Apr. 22, 2016.

* cited by examiner

DATA ITEM AGGREGATE PROBABILITY ANALYSIS SYSTEM

TECHNICAL FIELD

The present disclosure relates to systems and techniques for data integration, analysis, and visualization. More specifically, the present disclosure relates to systems and techniques for analyzing data item probabilities that can be grouped and aggregated according to various criteria.

BACKGROUND

Electronic record-keeping produces data sets with thousands or millions of records. The sheer quantity of information available for analysis may prevent meaningful conclusions from being drawn, or may prevent analysis from even being attempted. Data items in data sets may be associated with probabilities or risks that can be aggregated across various item dimensions, and an analysis of the probabilities associated with a particular data item may be incomplete or misleading without further consideration and analysis of aggregate probabilities.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to the visualization and analysis of aggregate probabilities associated with groups of data items. Data items may be grouped according to various criteria, and the probabilities associated with a group of data items may be aggregated and analyzed. Data item probabilities may be determined according to various risk models, and filtering criteria may be applied to select data items of interest. Interactive user interfaces may be generated for the display, analysis, and filtering of data items, and the risk models, display modes, and filters may be modified via the user interface. These embodiments of the present disclosure allow data item probabilities to be assessed and analyzed more efficiently, and facilitate detection of systemic and aggregate risks that are not otherwise detectable.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of geographic information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing technologies for analyzing aggregate probabilities are limited in various ways (e.g., they are slow and cumbersome, they require more resources than can practically be made available, etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing and updating of related item categories and associated risks, and presentation of the updates via interactive graphical user interfaces. Such features and others (e.g., generation of aggregate risks associated with various item categories) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Reference will now be made to the accompanying drawings, which illustrate exemplary embodiments of the present disclosure. In the drawings.

DETAILED DESCRIPTION

Overview

Figure 1:
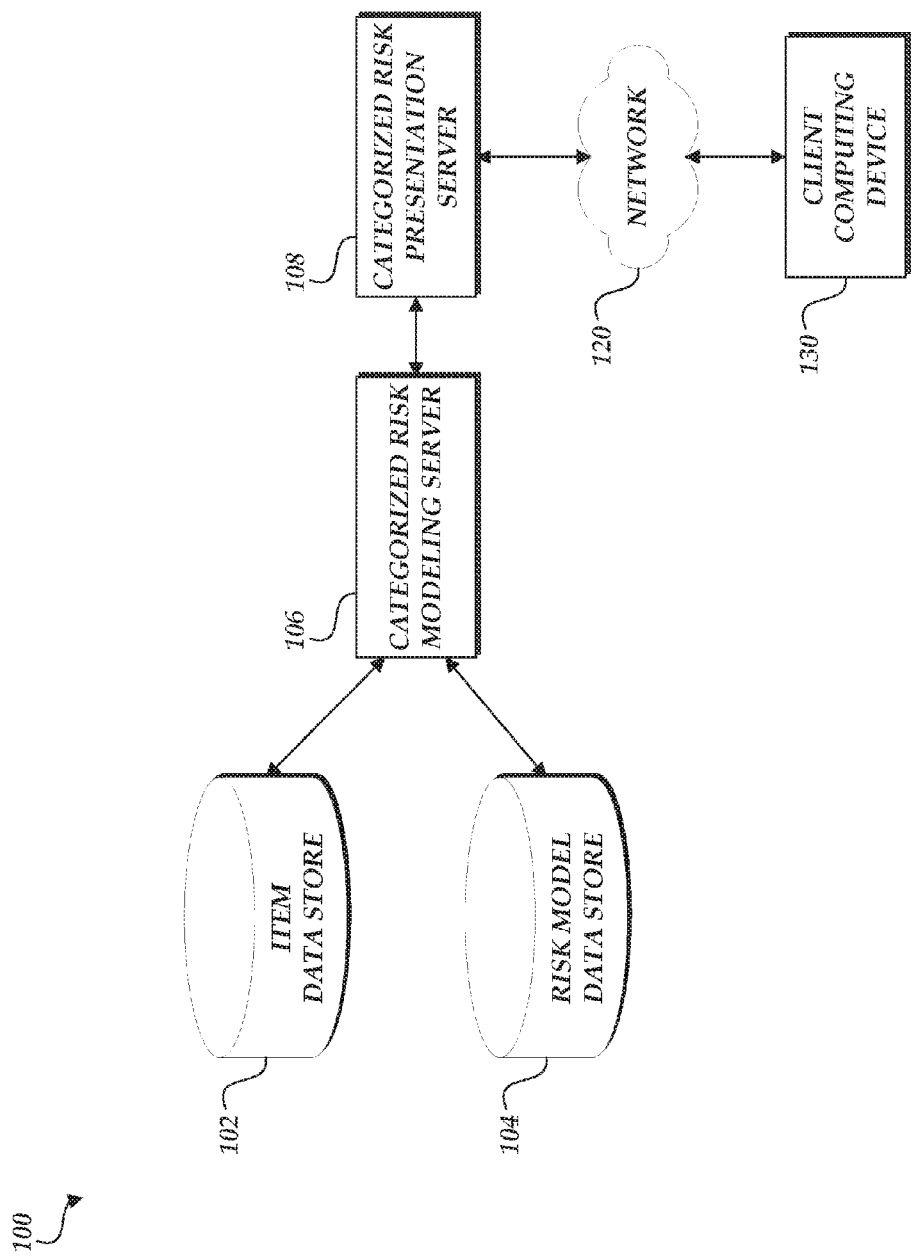
FIG. 1 is a schematic block diagram of an example network topology including a categorized risk modeling server, a categorized risk presentation server, an item data store, and a risk model data store in communication with a client computing device via a network.

Reference will now be made in detail to example embodiments, the examples of which are illustrated in the accompanying drawings. Whenever possible, the same reference numbers will be used throughout the drawings to refer to the same or like parts.

Embodiments of the present disclosure relate to systems, methods, and computer-readable mediums for automatically analyzing, and displaying aggregate risks or probabilities associated with data items that can be grouped according to their characteristics. Data items may be grouped, for example, according to geographic locations associated with the data items, business categories associated with the data items, or other criteria. Probabilities associated with the data items may be aggregated to determine and analyze probabilities for geographic regions or item categories. Data item probabilities may be determined or obtained according to various risk models, and data items and probabilities may be filtered and displayed to facilitate analysis.

For example, data items may represent real estate properties, and may have attributes that include geographic locations and property values. These data items may be grouped and analyzed using a risk model to determine a probability of, for example, loss due to flood, wildfire, or other event. As a further example, data items may represent shipping lanes, transit corridors, or individual freight vehicles, and may have attributes that include a geographic area of travel, mode of transportation, rate of travel, and the like. These data items may be grouped and analyzed using a risk model to determine a probability of delayed transit due to inclement weather, traffic congestion, a labor strike at a shipping terminal, or other factors. As a still further example, data items may represent small businesses, and may have attributes that allow categorization of the businesses into retail sales, household services, and the like. These data items may be grouped and analyzed using a risk model to determine, for example, economic risk associated with a change in the business climate. More generally, aspects of the present disclosure include any set of data items that can be associated with probabilities.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Choropleth Map: A type of geographic map display in which predefined geographic regions are colored or shaded according to a variable of interest, such as a cumulative risk or probability for data items associated with locations within the geographic region.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Item or Item: A data container for information representing specific things in the world that have a number of definable properties. For example, a data item can represent an entity such as a physical object, a parcel of land or other real property, a market instrument, a policy or contract, or other noun. Each data item may be associated with a unique identifier that uniquely identifies the data item. The item's attributes (e.g. metadata about the object) may be represented in one or more properties. Attributes may include, for example, a geographic location associated with the item, a value associated with the item, a probability associated with the item, an event associated with the item, and so forth.

Event: A change to a data item attribute, which may correspond to a change in the real-world entity represented by the data item. An event may be, for example, an increase or decrease in the value associated with the item.

Geographic Data Item or Geographic Item: A data item having an attribute that associates the data item with a particular geographic location, area, or region.

Heat Map: A type of geographic map display in which the regions to be colored or shaded are determined according to a variable of interest. A common example of a heat map is a weather forecast, in which the region that is shaded to indicate high temperatures in the 70-79° range varies on a day-to-day basis.

Probability or Risk: The likelihood that an event associated with a particular data item will occur.

Probability Category: A collection of data items that have similar probabilities and/or other attributes. For example, a probability category may include data items having a high probability, or data items having a low probability and a high value.

Properties: Attributes of a data item that represent individual data items. At a minimum, each property of a data item has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Risk Premium: A portion of a data item attribute that is attributed to the risk(s) associated with the data item. A risk premium may be expressed as a ratio, percentage, or amount. For example, an insurance policy on a parcel of land in a flood plain may have a higher cost than a policy on an equivalent parcel of land that is not in a flood plain. The risk premium may be expressed as the ratio of, or the delta between, these two values.

Transit Corridor: A path that may be followed when moving people or objects from one geographic point to another. A transit corridor may be associated with a data item, or may itself be a data item. Examples of transit corridors include highways and roadways, shipping lanes, flight paths, rivers, bus routes, subway lines, and so forth.

EXAMPLE DEVICES/SYSTEMS

FIG. 1 is a block diagram of an example network topology 100 for determining, aggregating, and analyzing data item probabilities in accordance with the present disclosure. In the illustrated embodiment, the network topology 100 includes an item data store 102, a risk model data store 104, a categorized risk modeling server 106, and a categorized risk presentation server 108 in communication with a client computing device 130 via a network 120. Generally, an item data store 102 may correspond to a hard disk drive, network accessible storage, or any other type of perpetual or substantially perpetual storage accessible by the geographic risk modeling server 106. For example, the item data store 102 of FIG. 1 may correspond to network accessible storage devices. Though depicted as external to the categorized risk modeling server 106, in some embodiments, the item data store 102 may be internal to the categorized risk modeling server 106.

In some embodiments, the network topology 100 further includes a risk model data store 104 in communication with the categorized risk modeling server 106. Generally, a risk model data store 104 may correspond to a hard disk drive, network accessible storage, or any other type of perpetual or substantially perpetual storage accessible by the geographic risk modeling server 106. For example, the risk model data store 104 of FIG. 1 may correspond to a network accessible storage device. Though depicted as external to the categorized risk modeling server 106, in some embodiments, the risk model data store 104 may be internal to the categorized risk modeling server 106. Further, in some embodiments, the risk model data store 104 may be omitted or combined with the item data store 102. Still further, in some embodiments, the risk model data store 104 and/or the item data store 102 may be implemented as a data pipeline system. Data pipeline systems are described in more detail in U.S. patent application Ser. No. 15/287,715, titled "Universal Data Pipeline," and filed Oct. 6, 2016; U.S. patent application Ser. No. 15/262,207, titled "Data Revision Control in Large-Scale Data Analytic Systems," and filed Sep. 12, 2016; and U.S. Provisional Patent Application No. 62/349,548, titled "Recording and Transforming Data in a Data Pipeline System," and filed Jun. 13, 2016. The entire disclosure of each of the above items is hereby made part of this specification as if set forth fully herein and incorporated by reference for all purposes, for all that it contains.

In various embodiments, the categorized risk modeling server 106 may correspond to a wide variety of computing devices configured to implement aspects of the present disclosure. For example, the categorized risk modeling server 106 can include one or more computing devices (e.g., server(s)), memory storing data and/or software instructions (e.g., database(s), memory device(s), etc.), and other known computing components. According to some embodiments, the categorized risk modeling server 106 can include one or more networked computers that execute processing in parallel or use a distributed computing architecture. The categorized risk modeling server 106 can be configured to communicate with one or more components of the network topology 100, and it can be configured to provide information via an interface(s) accessible by users over a network (e.g., the Internet). In some embodiments, the categorized risk modeling server 106 can include an application server configured to provide data to one or more categorized risk presentation servers 108 executing on computing systems connected to the categorized risk modeling server 106.

The network topology 100 further includes a network 120 operable to enable communication between the categorized risk presentation server 108 and the client computing device 130. The network 120 may be, for instance, a wide area network (WAN), a local area network (LAN), or a global communications network. In some embodiments, the item data store 102, a risk model data store 104, a categorized risk modeling server 106, and a categorized risk presentation server 108 may communicate via the network 120 or via a separate network, such as a private LAN.

The modules or components illustrated in FIG. 1 may include additional components, systems, and subsystems for facilitating the methods and processes. For example, in various embodiments, the item data store 102, risk model data store 104, categorized risk modeling server 106, and categorized risk presentation server 108 may be centralized in one computing device, distributed across several computing devices, implemented by one or more virtual machine instances, and/or distributed through a network.

Figure 2A:
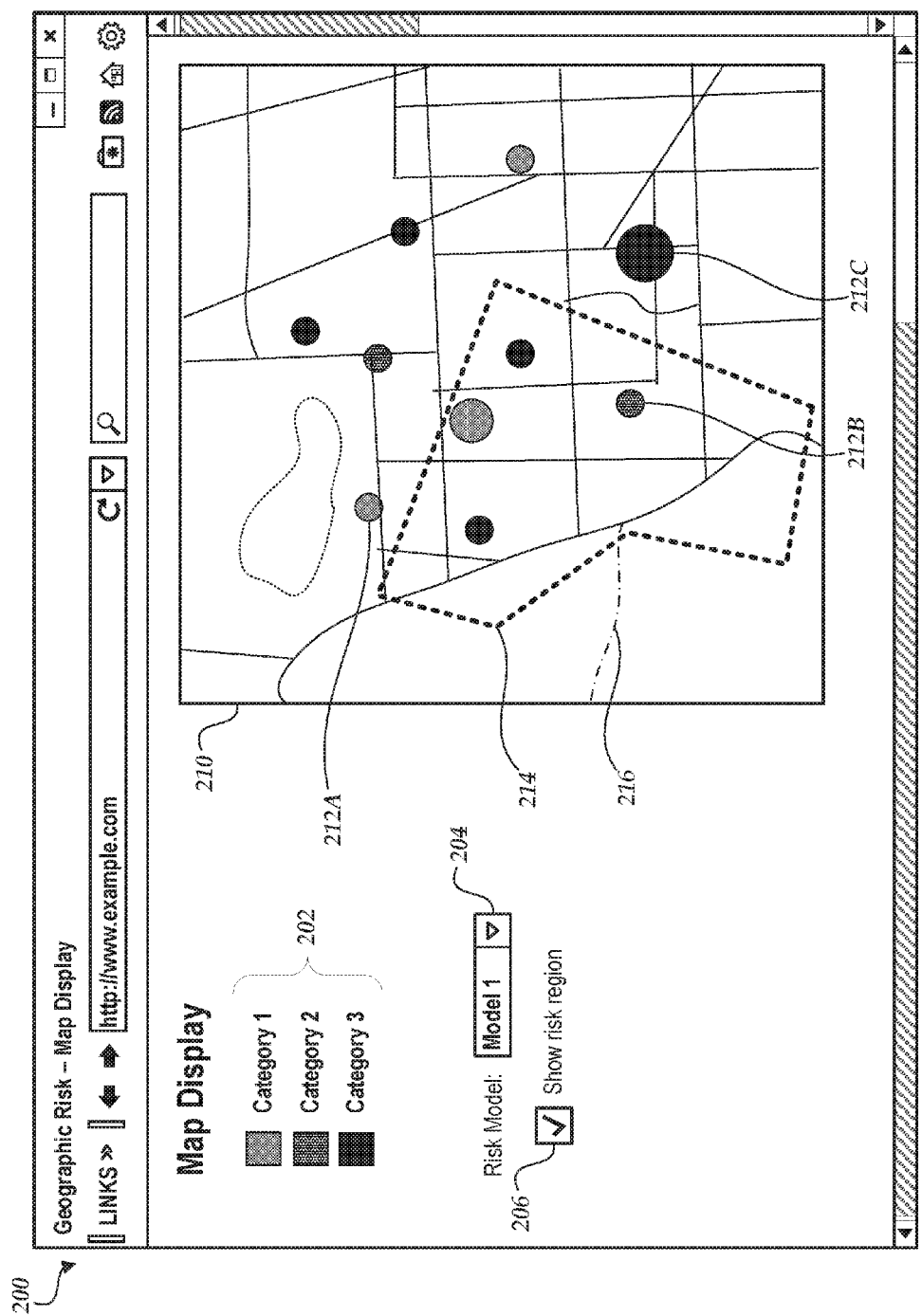
FIGS. 2A-2D are block diagrams of example user interfaces for presenting and interacting with aggregate probability analyses in accordance with aspects of the present disclosure.

With reference now to FIGS. 2A-2D, example user interfaces 200, 220, 240, and 260 for presentation of aggregated data item probability analyses will be described. FIG. 2A depicts an example user interface 200 in which data items, such as data items 212A-C, are displayed in relation to coordinates on a geographic map 210. The user interface 200 may be generated, for example, by the categorized risk presentation server 108 of FIG. 1. The user interface 200 may include a legend 202, which relates data items to a set of categories. In some embodiments, the categories may be various types of data items. For example, the categories may be commercial properties, residential properties, undeveloped land, and so forth. As further examples, the categories may be related to a size of a business (e.g., number of employees, revenue, etc.), a type of insurance policy (home, auto, property, etc.), or other types of data items. In further embodiments, the categories may relate to probabilities associated with the data items. For example, the categories may be a high-risk category, a medium-risk category, and a low-risk category. As further examples, the categories may be based on risk-to-loss ratios, risk premiums, or other metrics associated with data item probabilities.

The user interface 200 may further display a risk model selector 204, which enables a user to select various risk models. Various risk models may be applied to the data items to determine and associate a number of probabilities for each data item. For example, a risk model may determine a probability for a data item that corresponds to a risk of earthquake damage to a building. The probability may be determined based on data item attributes such as structural materials, building codes, and so forth. The risk model may also incorporate other factors such as earthquake fault lines, the footprint of previous earthquakes at or near the geographic location of the data item, the amount of damage caused by previous earthquakes in the region, and so on. As another example, other risk models may determine different probabilities for the same set of data items, such as a probability of flood damage or of an increase in property value. In some embodiments, the risk model may determine an expected value for the data item based on the probability of an event and the change in value that results from the event occurring. For example, the risk model may determine a 5% chance of damage that results in total economic loss of a building valued at $10 million. The risk model may therefore determine that the risk has an expected value of $500,000. In further embodiments, the risk model may determine and aggregate multiple expected values relating to various probabilities and corresponding increases or decreases in an item attribute.

The user interface 200 may further display a risk region checkbox 206, which enables the user to select whether a risk region 214 will be displayed on the geographic map 210. The risk region 214 may correspond to a particular geographic region of interest. As examples, the risk region 214 may be a low-lying area that is vulnerable to flooding, a district that has been zoned for industrial use or a particular tax rate, the actual or projected path of a storm, an area with particular demographics or population densities, or other characteristics of interest. In some embodiments, the user interface 200 may include multiple risk region checkboxes 206 or other controls that enable the user to select a number of regions of interest to overlay on the geographic map 210. In some embodiments, a set of risk regions 214 may correspond to a single external phenomenon. For example, a set of risk regions 214 may represent the path of a hurricane, and may include regions corresponding to the storm's intensity (e.g., Category 1, Category 2, etc.), relative distance from the storm's center, and so on. In further embodiments, the set of risk regions 214 may include regions based on geographic characteristics such as population density or zoning regulations, or regions based on data item attributes such as average property values or construction materials.

The user interface 200 may further display statistics regarding a selected risk region 214, such as the number of data items within the risk region 214, the aggregate values of data items within the risk region 214, aggregate probabilities for data items within the risk region 214, or other information. The visual display of risk regions 214 and corresponding statistics in the user interface 200 provides cognitive efficiencies and enables a user to analyze probabilities associated with particular regions more quickly.

The geographic map 210 may display a number of data items, such as data items 212A-C, at geographic locations or areas associated with the data items. In the illustrated embodiment, the data items 212A-C may be displayed using various sizes, shapes, shadings, and colors to indicate, for example, categories of data items, risks or other related metrics associated with the data items, attributes of the data items, and other characteristics. The geographic map 210 may further display an area of interest, as discussed above. The geographic map 210 may still further display one or more transit corridors 216, which may be displayed using various sizes, shapes, shadings, and colors in similar or corresponding fashion to the data items 212A-C. Transit corridors 216 may include, for example, sea lanes, bus routes, rail or subway routes, air corridors, planned or actual driving routes for commercial trucks and vehicles, and the like. In some embodiments, transit corridors may overlap one or more risk regions 214, and the geographic map 210 may display the overlapping regions, risks associated with the transit corridor 216 and the overlapping region, aggregate risks associated with the transit corridor, and other information. In further embodiments, the user interface 200 may display risks associated with delays, loss of cargo, loss in economic value, or combinations thereof. For example, the geographic map 210 may display a sea lane that overlaps the path of a storm, and may display a risk that the cargo will be lost at sea or a risk that the shipment will be delayed. In still further embodiments, the user interface 200 may display a risk of loss associated with shipment delays, such as a missed window of opportunity of sales (e.g., a holiday shopping season), expiration of perishable goods, penalties incurred for missing a contractual deadline, or other losses associated with delay. By displaying aggregated risks for an entire transit corridor 216, the geographic map 210 and the user interface 200 allow for more complete and efficient assessment of risks.

The user interface 200 may include more or fewer elements than those included for purposes of example in FIG. 2A. For example, the user interface 200 may include controls that enable the user to select or define the categories, filter the data items according to selected criteria, zoom or pan the geographic area displayed in the map 210, change the level of detail displayed on the map 210, or other controls. As a further example, the geographic map 210 may allow user selection of a particular data item, such as data item 212A, and may display additional information regarding the selected data item 212A. In some embodiments, the user interface 200 may include controls enabling the user to create, edit, delete, import, and/or export data items. Still further, the geographic map 210 may allow the user to define an area of interest, and may display statistics or other information regarding data items within the user-defined area of interest.

Figure 2B:
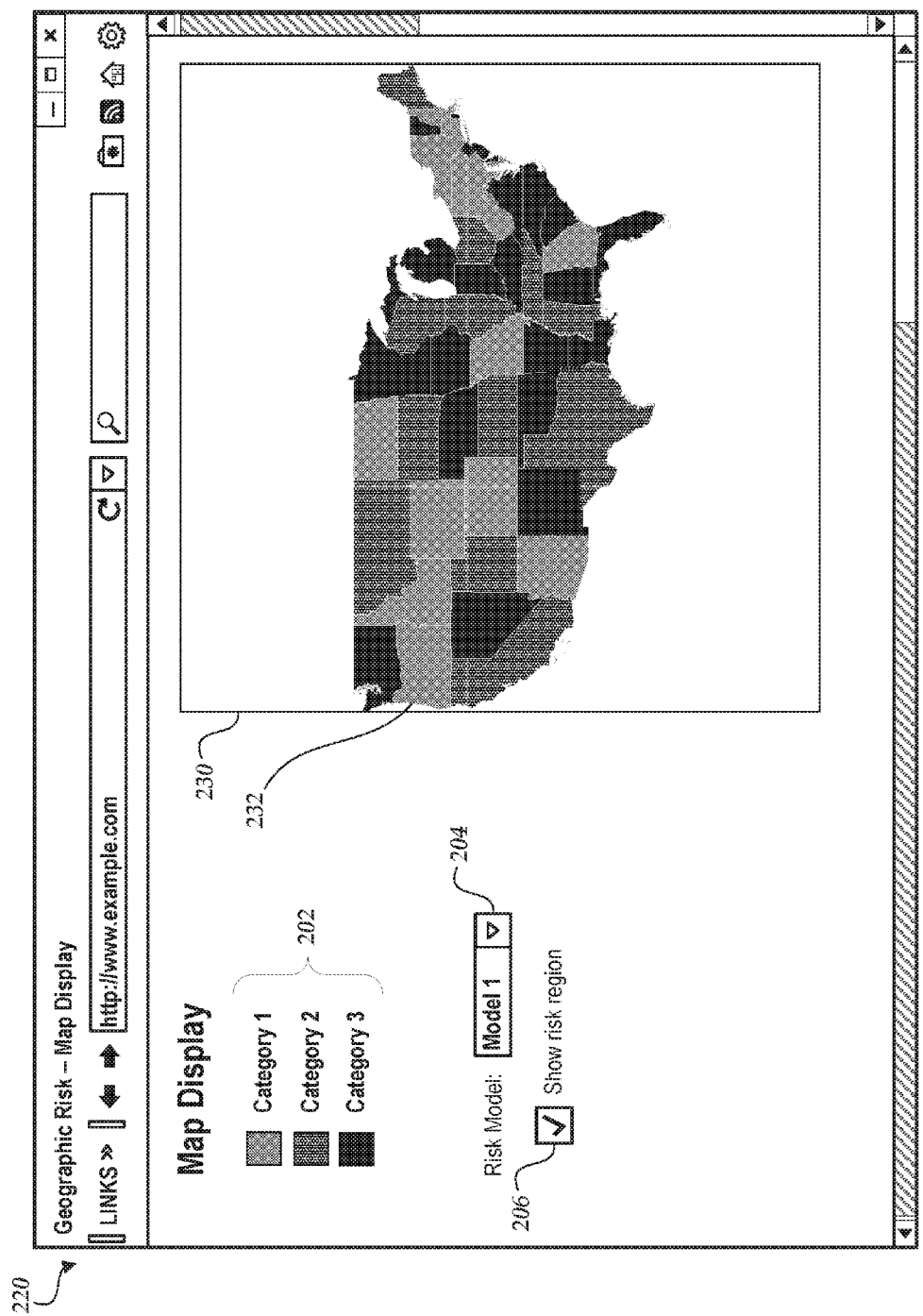

Turning now to FIG. 2B, an example user interface 220 for displaying probability analyses relating to geographic regions will be described. The user interface 220 may be generated, for example, by the geographic risk presentation server 108 of FIG. 1. The user interface 220 may include a legend 202, risk model selector 204, and risk region checkbox 206, which perform similar functions to those described with reference to FIG. 2A. The user interface 220 may further include a map display 230, which displays a choropleth map 232. The choropleth map 232 may display risk categories associated with predefined geographic regions. The risk categories may be determined based on data items within each region, whose individual risk or probability attributes may be aggregated to determine a risk category for the region.

In some embodiments, the map display 230 may display a heat map, in which the boundaries of the geographic regions to be shaded are determined based on the data items, rather than the choropleth map illustrated in FIG. 2B. In further embodiments, the map display 230 may display a heat map as an overlay. In still further embodiments, the map display 230 may enable user selection of a particular region, and may display information including the aggregated or cumulative risk associated with the region, the data items within the region, and/or other information regarding the region.

Figure 2C:
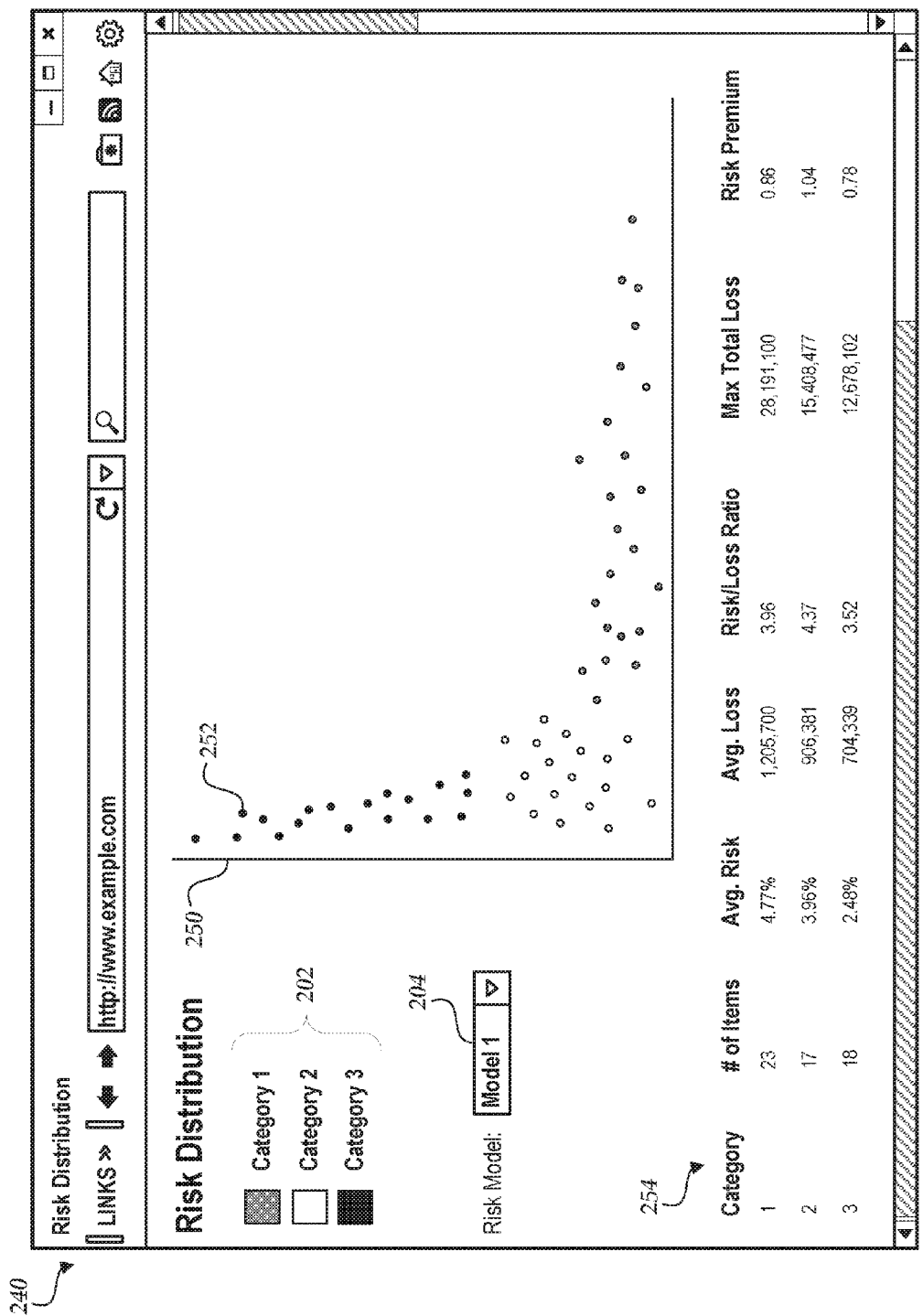

Turning now to FIG. 2C, an example user interface 240 for displaying probability analyses for data items relative to each other will be described. The user interface 240 may be generated, for example, by the categorized risk presentation server 108 of FIG. 1. The user interface 240 may include a legend 202 and risk model selector 204, which perform similar functions to those described with reference to FIG. 2A. In some embodiments, the user interface 240 may further include controls that enable the user to filter the displayed data items to include only those within an area of interest, or to apply other filtering criteria.

The user interface 240 may further include a scatterplot display 250, which may display and categorize data items (such as data item 252). In some embodiments, the user interface 240 may include controls that enable the user to specify the axes to use for the scatterplot display, the data items and/or categories of data items to display, and so forth. In other embodiments, the data items and/or categories may be selected through another user interface, such as the user interface 220 described above with reference to FIG. 2B. For example, the map display 230 of FIG. 2B may have selectable geographic regions, and selection of a geographic region may pre-populate the user interface 240 with data items corresponding to that geographic region. In further embodiments, the user interface 240 may enable the user to specify more than two axes, and may display one or more two- or three-dimensional scatterplots using the specified axes. Illustratively, the axes may include a risk/loss ratio, risk premium, a maximum total loss, or other attributes of the data item or characteristics of the associated risk(s).

In some embodiments, the scatterplot display 250 may enable selection of a data item, such as data item 252, and display additional information regarding the data item 252. In further embodiments, the scatterplot display 250, the legend 202, or the category table 254 may enable selection of a category, and display additional information regarding the category. The category table 254 may display information regarding the categories, which may be determined dynamically or based on specified criteria. For example, a category may be specified for data items having a risk premium above 1.0 and a risk/loss ratio below 1.0. As a further example, a category may be determined based on the number of data items analyzed and their relative distance from each other on the scatterplot, such that a grouping of data items may be determined based on the gaps between data items on the scatterplot.

Figure 2D:
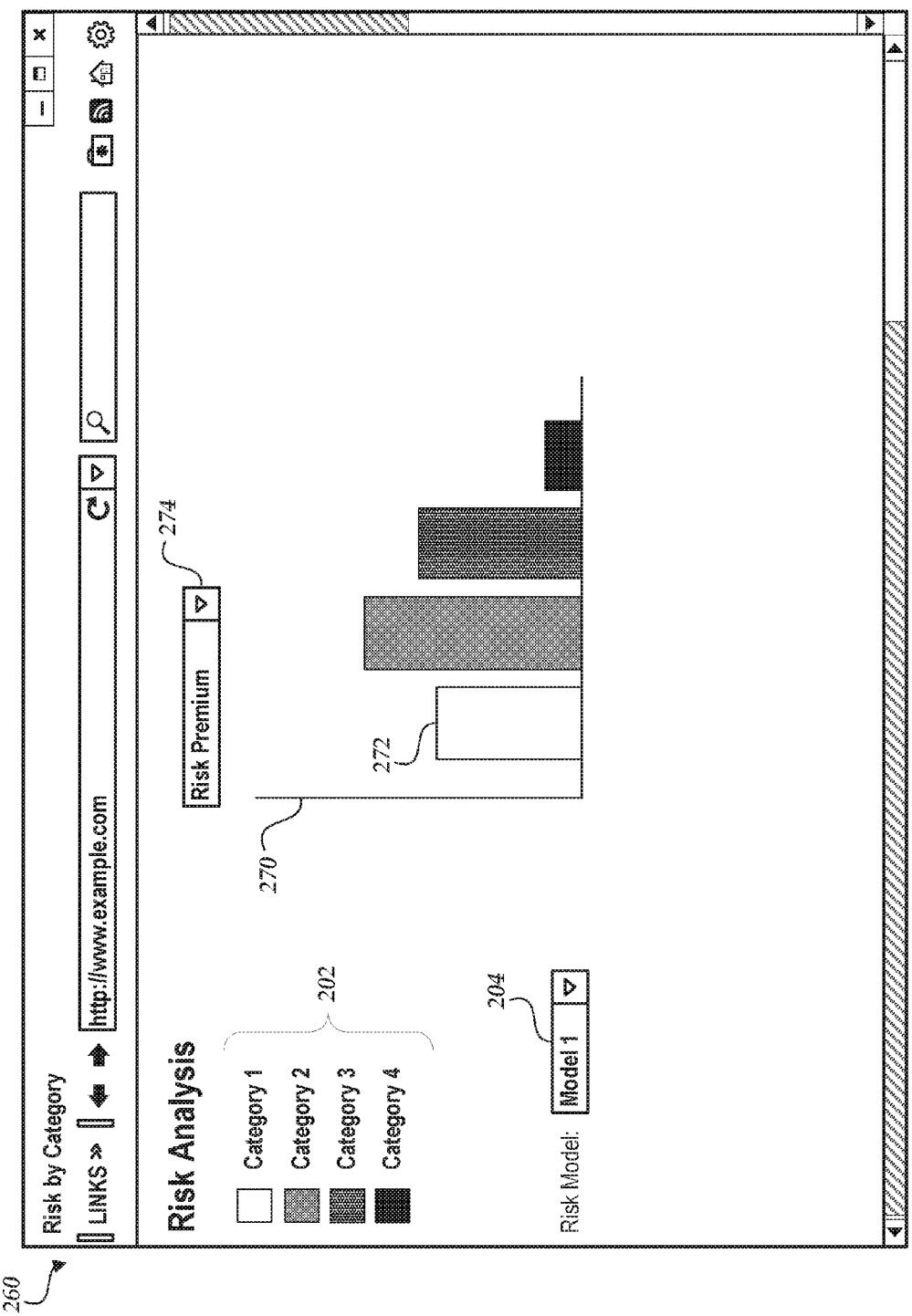

Turning now to FIG. 2D, an example user interface 260 for displaying various properties of probability analyses for data items will be described. The user interface 260 may be generated, for example, by the categorized risk presentation server 108 of FIG. 1. The user interface 240 may include a legend 202 and risk model selector 204, which perform similar functions to those described with reference to FIG. 2A.

The user interface 260 may further include a bar graph display 270, which may display probabilities or other metrics relating to data item categories. For example, the bar graph data point 272 may correspond to a risk premium associated with data items in the first category. The user interface 260 may include a metric selector 274, which may enable the user to select the metric to be displayed in the bar graph display 270. Alternatively, in some embodiments, selection of a row or column in the category table 254 of FIG. 2C may pre-populate the user interface 260 with a chart of the selected data. As described above, data item categories may relate to particular characteristics or attributes of data items, such as geographic regions that contain sets of data items, or data items that have been categorized by a risk model. The user interface 260 may further include other user interface elements, such as a table that displays information relating to individual data items.

Figure 3:
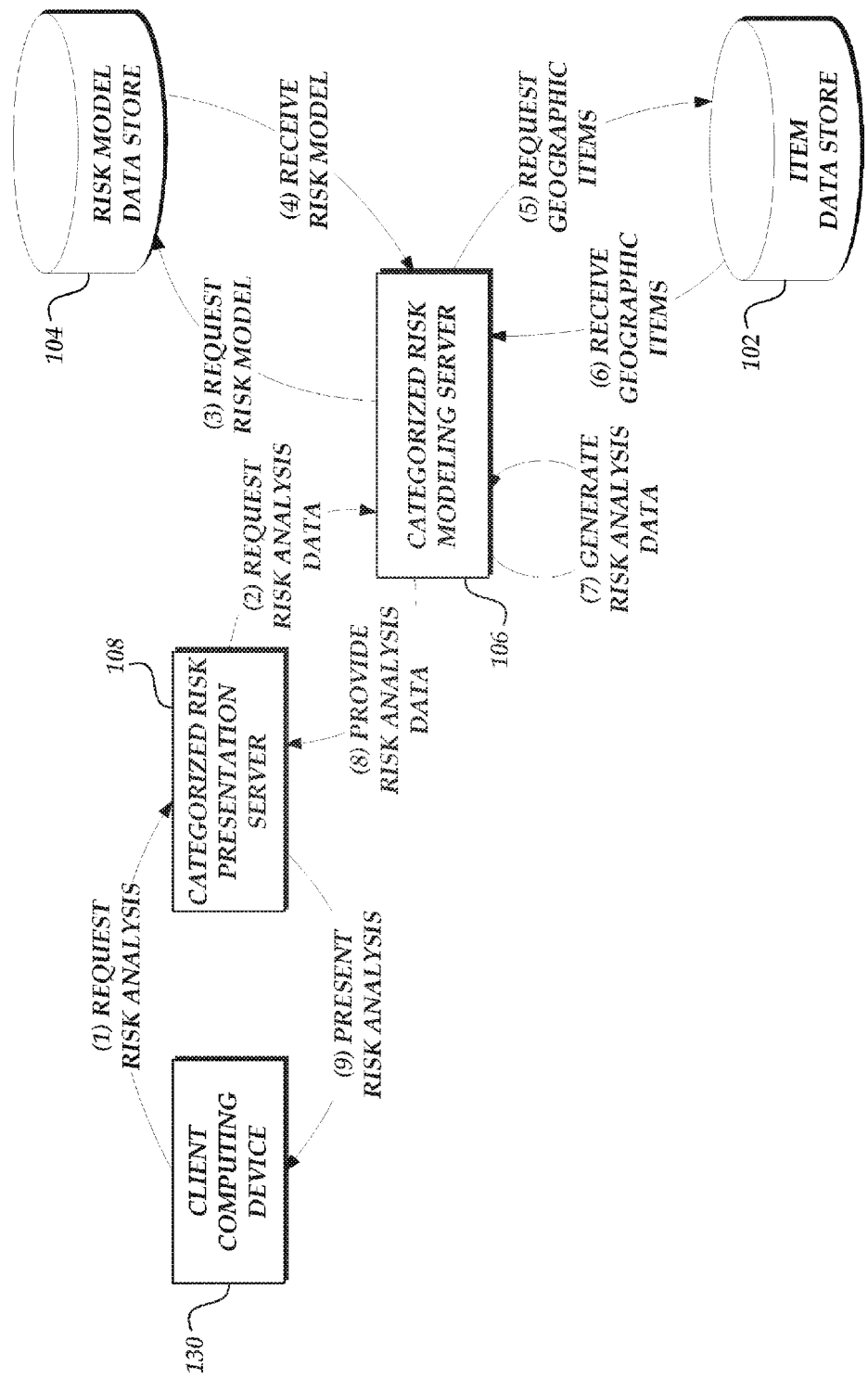
FIG. 3 is an example block diagram depicting aggregation, analysis, and presentation of categorized risks in accordance with aspects of the present disclosure.

FIG. 3 is an example block diagram that depicts generation and presentation of an aggregate risk analysis. At (1), a client computing device requests a risk analysis from the categorized risk presentation server. In various embodiments, the request may include a category or categories to be analyzed, a data item or items to be analyzed, a risk model or models to be utilized in the analysis, filtering criteria for including or excluding data items from the analysis, or other criteria. Although depicted in FIG. 3 as external to the client computing device 130, in some embodiments the categorized risk presentation server 108 may be implemented as an application or other component that resides within the client computing device 130.

At (2), the categorized risk presentation server 108 requests that the categorized risk modeling server 106 provide risk analysis data. As with the categorized risk presentation server 108, in some embodiments the categorized risk modeling server 106 may reside within the client computing device 130, and as described above all or some functions of the categorized risk presentation server 108 and the categorized risk modeling server 106 may be combined or separated in various ways.

At (3), the categorized risk modeling server 106 requests a risk model from the risk model data store 104. Illustratively, the categorized risk modeling server 106 may determine a risk model based on the request (which, as described above, may include or specify a risk model to use), or may use a predetermined or default risk model. For example, the categorized risk modeling server 106 may determine a risk model to use based on characteristics or attributes of data items specified in the request. In some embodiments, the categorized risk modeling server 106 may obtain user preferences that specify a risk model to be used. At (4), the risk model data store 104 provides the requested risk model.

At (5), the categorized risk modeling server 106 requests data items that are associated with one or more categories. In some embodiments, as described above, the categorized risk modeling server 106 determines the categories based on the request. For example, the request may be for a risk analysis of data items associated with South America. The categorized risk modeling server 106 may thus determine the geographic regions corresponding to the countries of South America as the categories to analyze, and may request data items associated with these geographic regions. In some embodiments, the request may specify a level of granularity, such as a city level, county level, state level, and the like, and the categorized risk modeling server 106 may determine geographic regions and corresponding data items based on the specified level of granularity. At (6), the item data store 102 provides the requested data items.

At (7), the categorized risk modeling server 106 applies the risk model to the data items and regions to generate aggregated risk analysis data for the regions. As described above, a risk model may specify various attributes of data items and regions to include in the model. In some embodiments, the categorized risk modeling server 106 may apply filtering criteria to include or exclude various data items from the model. At (8), the categorized risk modeling server 106 provides the risk analysis data to the categorized risk presentation server 108, and at (9) the categorized risk presentation server 108 presents the risk analysis data to the client computing device 130. In various embodiments, the categorized risk presentation server 108 generates a user interface, instructions for generating a user interface, or risk analysis data that may be presented via a user interface to the client computing device 130.

In various embodiments, the interactions depicted in FIG. 3 may be combined, separated, or carried out in different orders than those depicted in the example illustration. For example, the interactions at (5) and (6) may precede the interactions at (3) and (4). As a further example, the interactions at (2)-(8) may be carried out independently of the interaction at (1), and the resulting risk analysis data may be stored or cached. In some embodiments, the categorized risk presentation server 108 may interact directly with the risk model data store 104 and/or the item data store 102 in order to obtain and present information regarding available risk models and available data items. In further embodiments, the client computing device 130 may interact directly with the risk model data store 104 and/or the item data store 102, obtain data items to be analyzed and/or risk models to be used, and include or specify them in the request.

Figure 4:
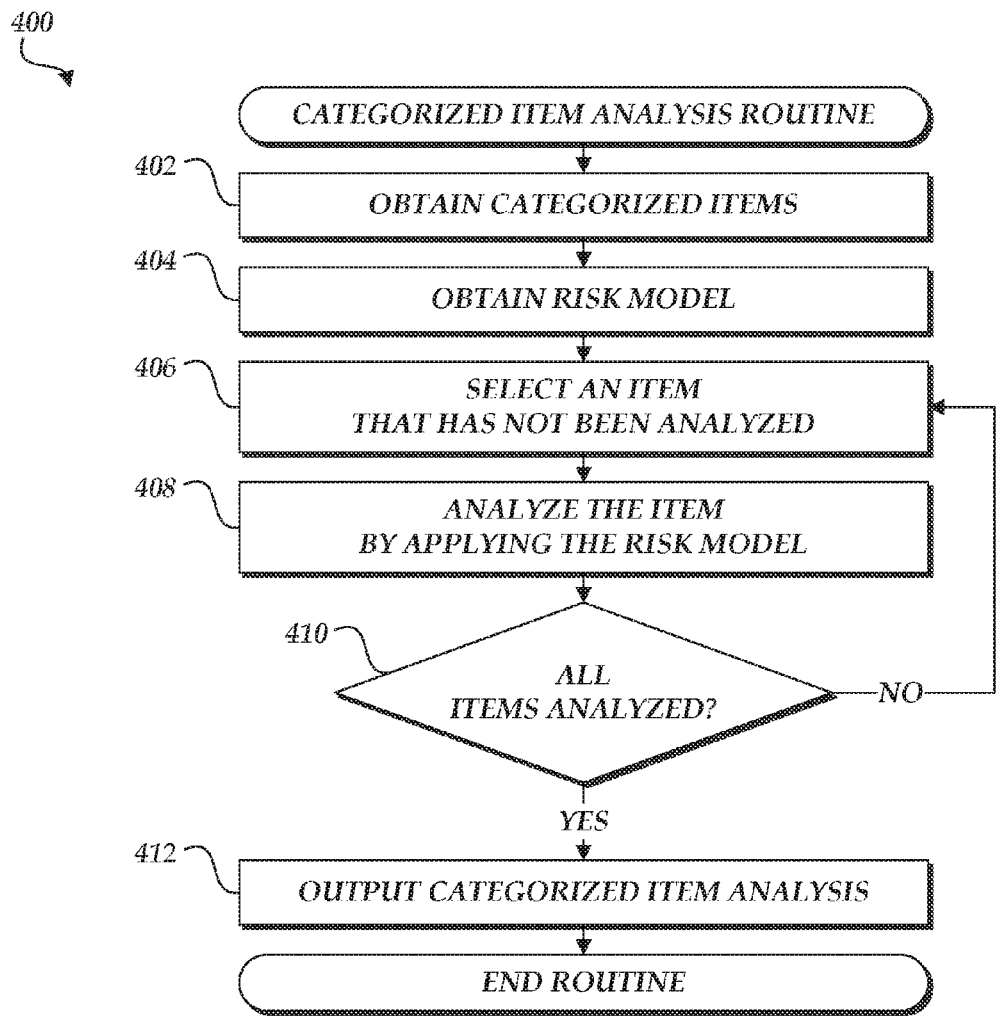
FIG. 4 is a flow diagram depicting an example routine for analyzing probabilities associated with categorized data items in accordance with aspects of the present disclosure.

Turning now to FIG. 4, an example routine 400 for analyzing categorized items will be described. The routine 400 may be carried out, for example, by the categorized risk modeling server 106 of FIG. 1. At block 402, categorized data items may be obtained. In some embodiments, as described above, filtering criteria may be applied to obtain a subset of available data items. For example, filtering criteria may be applied to obtain only data items that are within North America, that correspond to adult men between the ages of 20 and 45, or other criteria that may be applied to various attributes of the data item. In further embodiments, categories may be determined for data items based on various data item attributes.

At block 404, a risk model may be obtained. Illustratively, as described above, the risk model may include rules or instructions for determining data item risks. For example, the risk model may specify that buildings within a particular geographic area are at a base 5% risk of loss due to wildfire, that the risk is increased by 2% if the building is made of wood, decreased by 1% if the building is made of brick, and decreased by 1% if certain safety measures have been implemented with regard to the building or the surrounding property. As a further example, the risk model may specify that men over the age of 50 are at a base 3% risk of lung cancer, women over the age of 45 are at a base 2% risk of lung cancer, and that the risk is multiplied by 1.5× if the person smokes. One skilled in the art will appreciate that the risk model may be any set of rules or instructions that may be applied to a data item and used to model and analyze risks.

At block 406, a data item that has not yet been analyzed may be selected, and at block 408 the data item may be analyzed by applying the risk model. In various embodiments, the risk model may determine risks based on attributes of the data item, rules or criteria relating to an item category, relationships between the data item and other data items, or other factors. The risk model may further modify the data item to include additional attributes, such as probabilities or risks, or to recalculate risk premiums or other attributes that are based on a particular risk.

At block 410, a determination may be made as to whether all data items have been analyzed. If not, the routine 400 branches to block 406, where a new data item that has not yet been analyzed may be selected, and the routine 400 then iterates until all data items have been analyzed. When the determination at block 410 is that all data items have been analyzed, the routine 400 branches to block 412, where the categorized item analysis may be output. In some embodiments, as described above, the categorized item analysis may be output to the categorized risk presentation server 108 of FIG. 1, which may generate a user interface that displays the item analysis. In other embodiments, the item analysis may be output directly to the client computing device 130 of FIG. 1, or to another device.

One skilled in the art will appreciate that variations on the routine 400 are within the scope of the present disclosure. For example, blocks 402 and 404 may be carried out in either order, or block 410 may be carried out before block 406. In some embodiments, multiple risk models may be obtained and applied to an item sequentially or in parallel. In further embodiments, the analysis generated by applying a first risk model may be used by a second risk model in order to analyze more complex risks.

Figure 5:
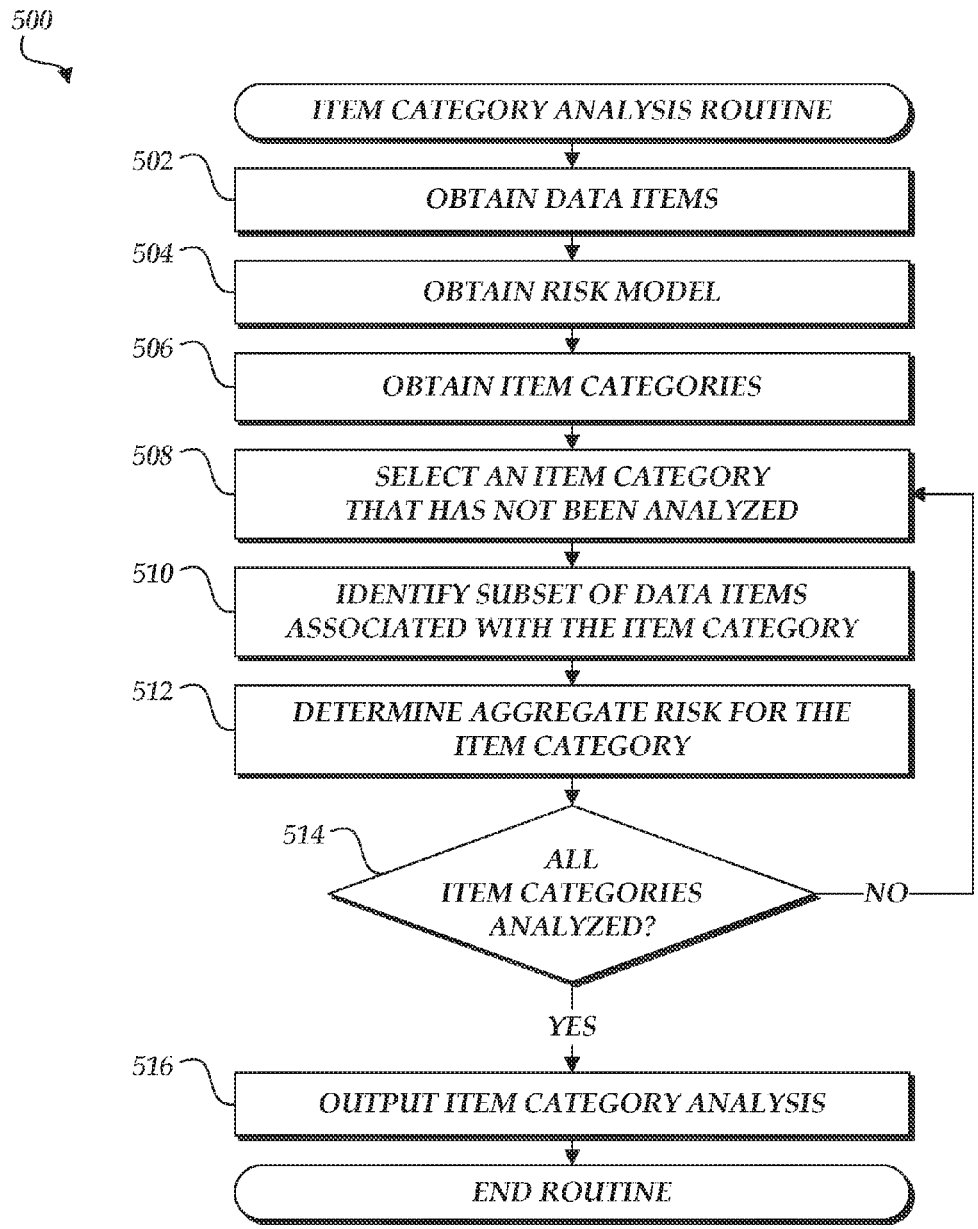
FIG. 5 is a flow diagram depicting an example routine for analyzing probabilities associated with item categories in accordance with aspects of the present disclosure.

FIG. 5 depicts an example routine 500 for aggregating and analyzing risks that correspond to an item category. The routine 500 may be carried out, for example, by the categorized risk modeling server 106 of FIG. 1. At block 502, data items may be obtained. In some embodiments, as described above, filtering criteria may be applied to obtain a subset of available data items. At block 504, a risk model may be obtained, which as described above may include rules or instructions for determining data item risks.

At block 506, item categories may be obtained. In some embodiments, item categories may be obtained based upon the items that were obtained, such that each item is contained in at least one of the categories. In other embodiments, item categories may be predetermined or specified as part of a request. In further embodiments, a level of granularity may be obtained, and the categories may be obtained by dividing a larger category into categories. For example, the item categories may be geographic regions, and a level of granularity may specify city blocks or counties. A larger category of data items, such as a city or state region, may thus be divided accordingly into categories having the requested level of granularity.

At block 508, an item category that has not yet been analyzed may be selected, and block 510 a subset of the data items may be identified. Illustratively, the subset may include data items associated the item category. For example, the subset may include data items with locations or areas within an identified geographic region, and/or with areas that overlap the geographic region, such as a sea lane or flight path.

At block 512, an aggregate risk may be determined for the item category. Illustratively, the aggregate risk may be determined by using a routine, such as the routine 400 depicted in FIG. 4, to analyze the risks for the individual items in the subset, and then summing, averaging, sampling, or otherwise processing the item risks to generate an aggregate risk for the category.

At block 514, a determination may be made as to whether all item categories have been analyzed. If not, the routine 500 branches to block 508, where another item category may be selected, and the routine 500 may then iterate until all item categories have been analyzed. If the determination at block 514 is that all item categories have been analyzed, then the routine 500 branches to block 516, where the item category analysis may be output. In some embodiments, as described above, the item category analysis may be output to the categorized risk presentation server 108 of FIG. 1, which may generate a user interface that displays the item category analysis. In other embodiments, the item category analysis may be output directly to the client computing device 130 of FIG. 1, or to another device.

One skilled in the art will appreciate that variations on the routine 500 are within the scope of the present disclosure. For example, blocks, 502, 504, and 506 may be carried out in any order, or may be carried out separately prior to the start of routine 500. As a further example, block 514 may be carried out before block 508. In some embodiments, multiple risk models may be obtained and applied to an item category sequentially or in parallel. In further embodiments, the analysis generated by applying a first risk model may be used by a second risk model in order to analyze more complex risks.

ADDITIONAL IMPLEMENTATION DETAILS AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
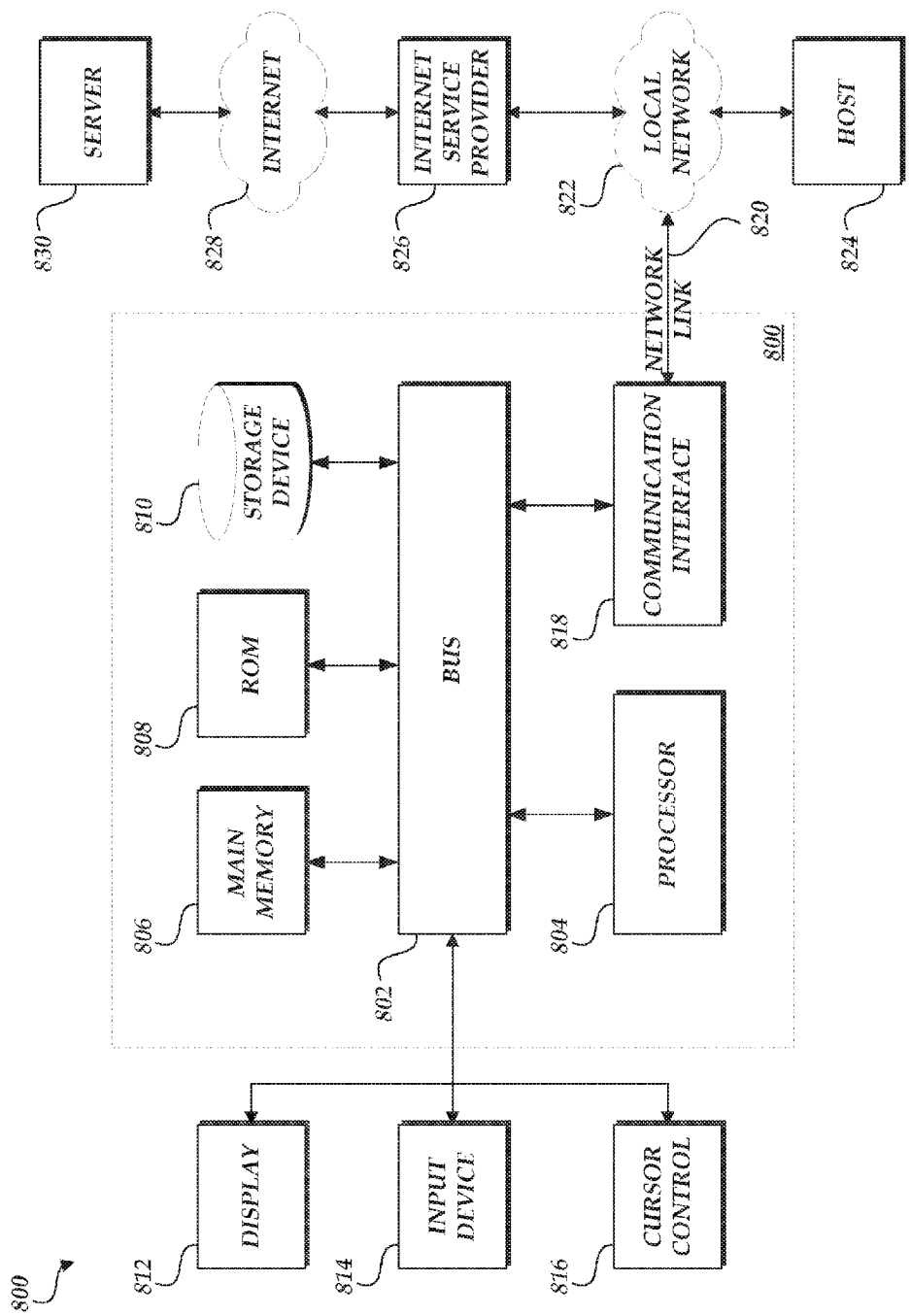
FIG. 6 is a block diagram of an example computer system consistent with embodiments of the present disclosure.

For example, FIG. 6 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a data store configured to store data items and probabilities; and
a processor in communication with the data store, the processor configured to execute specific computer-executable instructions to at least:
receive information regarding a first data item;
determine a geographic location of the first data item;
determine, based at least in part on a risk model, an event probability associated with a geographic region, the event probability indicating a probability that an event affecting the geographic region will occur, the geographic region including the geographic location of the first data item;
obtain, from the data store, a plurality of data items, wherein each of the plurality of data items is associated with a respective geographic location in the geographic region;
determine, based at least in part on the risk model, the event probability, and one or more attributes of the first data item, a probability that the event will change a first attribute of the first data item, and a predicted attribute change to the first attribute of the first data item;
for individual data items of the plurality of data items, determine, based at least in part on the risk model, the event probability, and one or more attributes of the data item, a probability that the event will change the first attribute of the data item, and a predicted change to the first attribute of the data item;
determine a probability associated with the geographic region based at least in part on the event probability, the probabilities that the event will change the first attributes, and the predicted changes to the first attributes;
determine a probability category of the first data item based at least in part on: the probability associated with the geographic region, the probability that the event will change the first attribute of the first data item, and the probabilities that the event will change the first attribute of individual data items of the plurality of data items;
generate for display a user interface, the user interface including at least:
a geographic map identifying the geographic region, the geographic location of the first data item, and the geographic locations of the plurality of items, wherein a shading of an icon displayed at the geographic location of the first data item indicates the probability category of the first data item, and wherein a size of the icon indicates the predicted change to the first attribute of the first data item; and
cause display of the user interface.

2. The system of claim 1, wherein the data store is further configured to store geographic regions, and wherein the processor is configured to obtain the geographic region from the data store.

3. The system of claim 1, wherein the processor is configured to determine the probability associated with the geographic region based at least in part on one or more previous events associated with the geographic region.

4. The system of claim 3, wherein the processor configured to determine the probability associated with the geographic region is configured to:
determine the probability associated with the geographic region based at least in part on a predicted change to a second attribute of individual data items within the plurality of data items.

5. The system of claim 1, wherein the geographic map includes at least the geographic region.

6. The system of claim 5, wherein the map display further includes an area of interest.

7. The system of claim 6, wherein the area of interest comprises at least one of a storm track, weather track, flood plain, drought zone, earthquake zone, tsunami zone, avalanche zone, tornado zone, volcano zone, or wildfire zone.

8. The system of claim 6, wherein the area of interest comprises a predicted weather track.

9. The system of claim 6, wherein the area of interest comprises a geographic route.

10. The system of claim 1, wherein the user interface further includes at least one of a scatterplot display or a bar chart display.

11. The system of claim 1, wherein the data store is further configured to store risk models, and wherein the processor is further configured to:
obtain, from the data store, the risk model.

12. The system of claim 11, wherein the processor is further configured to determine the probability associated with the geographic region based at least in part on the risk model.

13. The system of claim 11, wherein the processor is further configured to receive, via the user interface, an indication of a selection of the risk model.

14. The system of claim 1, wherein the processor is further configured to:
receive, via the user interface, an indication of an area of interest;
determine a subset of the plurality of data items, wherein each data item of the plurality of data items is associated with a geographic location within the area of interest;
generate a second user interface, the second user interface including at least the subset of the plurality of data items; and
cause display of the second user interface.

15. The system of claim 1, wherein the probability category of the first data item comprises a high risk category.

16. The system of claim 1, wherein the probability category of the first data item comprises a category of data items having a high risk-to-loss ratio.

17. A system comprising:
a data store configured to store data items, respective geographic locations associated with the data items, and respective probabilities associated with the data items; and
a processor in communication with the data store, the processor configured to execute specific computer-executable instructions to at least:
receive an indication of geographic grouping criteria;
determine, based on the geographic grouping criteria, a plurality of geographic regions;
analyze the data items and associated geographic locations to determine a plurality of groups of data items associated with respective geographic regions;
for each group in the plurality of groups of data items, analyze the data items of the group to determine, based at least in part on a risk model and one or more attributes of individual data items of the group, an aggregate probability associated with the group of data items, the aggregate probability indicating a level of exposure to a risk associated with at least a portion of the respective geographic region; and
generate user interface data useable for rendering a user interface, the user interface including graphical representations of the geographic regions, wherein the graphical representations include visualizations indicative of the aggregate probabilities associated with the groups associated with the geographic regions and visualizations of individual data items from at least one group of data items, wherein a first attribute of a visualization of an individual data item indicates a probability category of the individual data item, and wherein a second attribute of the visualization of the individual data item indicates a predicted change to the one or more attributes of the individual data item.

18. The system of claim 17, wherein the processor is further configured to receive an indication of filtering criteria.

19. The system of claim 18, wherein the processor is further configured to determine the plurality of groups of data items based at least in part on the filtering criteria.

20. The system of claim 17, wherein the geographic grouping criteria specify a granularity of the plurality of geographic regions.

* * * * *